(12) United States Patent
Broberg (10) Patent No.: US 7,789,574 B2
(45) Date of Patent: Sep. 7, 2010

(54) CAMERA MOUNT

(75) Inventor: James E. Broberg, Crystal Lake, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 325 days.

(21) Appl. No.: 11/941,480

(22) Filed: Nov. 16, 2007

(65) Prior Publication Data

US 2009/0129769 A1    May 21, 2009

(51) Int. Cl.
G03B 17/00    (2006.01)
(52) U.S. Cl. .................... 396/428; 396/419; 396/423
(58) Field of Classification Search ............. 396/419, 396/428, 423; 248/187.1, 349.1; D16/242, D16/244, 243
See application file for complete search history.

(56) References Cited

U.S. PATENT DOCUMENTS

| | | | |
|---|---|---|---|
| 3,944,279 A | 3/1976 | Blackstock et al. | |
| 4,289,393 A * | 9/1981 | Kawazoe | 396/428 |
| 4,542,966 A * | 9/1985 | Knaudt | 396/425 |
| 4,577,827 A * | 3/1986 | Eliscu | 248/656 |
| 4,951,072 A * | 8/1990 | Harvey et al. | 396/5 |
| 5,275,364 A * | 1/1994 | Burger et al. | 248/125.1 |
| D363,945 S | 11/1995 | LaBree | |
| 5,497,214 A * | 3/1996 | Labree | 396/428 |
| 6,286,796 B1 | 9/2001 | Pugliesi | |
| 6,581,891 B1* | 6/2003 | Byrd | 248/219.4 |
| 6,623,182 B2 | 9/2003 | Tatera | |
| 6,839,996 B2 | 1/2005 | Kim | |
| 6,932,305 B2 | 8/2005 | Morales et al. | |
| 7,202,903 B2* | 4/2007 | Lin et al. | 348/373 |
| 7,249,740 B1 | 7/2007 | Morales et al. | |
| 2002/0096610 A1 | 7/2002 | Fernandez | |
| 2006/0088308 A1* | 4/2006 | Kenoyer et al. | 396/419 |
| 2006/0197001 A1 | 9/2006 | Parker et al. | |
| 2007/0212057 A1* | 9/2007 | Liang | 396/428 |

FOREIGN PATENT DOCUMENTS

FR    2.528.603    6/1982

* cited by examiner

*Primary Examiner*—W. B. Perkey
*Assistant Examiner*—Warren K Fenwick
(74) *Attorney, Agent, or Firm*—Mathew R. P. Perrone, Jr.; Brie A. Crawford (57) ABSTRACT

A camera mount securely attaches to a variety of mounting surfaces and holds a motion activated camera in a desired position. The camera mount permits the camera mount to positioned as desired on the mounting the mounting bracket which has a camera plate pivotally attached thereto.

17 Claims, 12 Drawing Sheets

CAMERA MOUNT

This invention to a camera mount and more particularly to a camera mount for use in hunting or tracking of game and wild animals.

BACKGROUND OF THE INVENTION

Whether wild game is tracked, studied, or otherwise observed for research purposes, hunting purposes, conservation purposes or other purposes; it is very desirable to know the paths taken by the game and when those paths are taken. To that end, a camera may be used. There are many cameras suitable for this purpose.

Typically, such a camera is activated by motion, in that a passing animal can cause the camera to take a picture, and indicate both the date and time of the picture. Then the camera can be left at a desired site, without a human presence. A picture may then be taken as an animal passes the camera. With the proper setting, the time and date of the picture or a series of pictures of the animal can be recorded. Then a schedule or other information can be obtained about the animal from the information in the series of pictures.

A major problem in the use of such cameras is a proper mounting procedure for the camera. The appropriate mounting procedure greatly complicates the use of such a camera. There is a great variation in mounting surfaces for the camera in the desired areas. With such variation, it is difficult to achieve the desired camera position.

Typical of mounting surfaces for a camera include trees, fence posts, farm angle irons and other supporting surfaces. No one mounting bracket efficiently offers attachments to the various mounting surfaces. Furthermore, lack of adjustability for the mounting bracket adds to the problem of using the camera effectively.

Also, the area, in which the camera is to provide a survey of animals, can vary from flat to hilly surfaces. It is thus useful for a camera mount to provide adjustability to allow the camera to take pictures at a flat, upward, or downward angle depending upon the terrain and the mounting surface.

It thus becomes clear that a mounting bracket must be flexible to be useful. Providing the bracket for supporting a camera to be adjustable and attachable to a wide variety of surfaces creates a mounting bracket for the camera, which can result in great advantages. It is also advantageous for the camera mount to be positioned on any side of the surface including the front, back, right side, or left side to accommodate animal activity.

SUMMARY OF THE INVENTION

Among the many objectives of the present invention is the provision of a camera mount which can be mounted to a variety of surfaces.

Another objective of the present invention is the provision of a camera mount, which can be positioned on any face of the mounting surface.

Also, an objective of the present invention is the provision of a camera mount, which can be adjusted at a variety of angles in order to accommodate the terrain.

Moreover, an objective of the present invention is the provision of a camera mount which is securely but easily installed on and removed from the desired mounting surface.

A further objective of the present invention is the provision of a camera mount, which can be secured to a tree.

A still further objective of the present invention is the provision of a camera mount, which can be secured to a fence post.

Yet a further objective of the present invention is the provision of a camera mount, which can be adjusted at an upward angle in order to accommodate the terrain.

Another objective of the present invention is the provision of a camera mount, which can be adjusted at a downward angle in order to accommodate the terrain.

Yet another objective of the present invention is the provision of a camera mount, which can be adjusted at a flat angle in order to accommodate the terrain.

Still another objective of the present invention is the provision of a camera mount, which can receive a camera to track animals passing a particular point at a particular time.

These and other objectives of the invention (which other objectives become clear by consideration of the specification, claims and drawings as a whole) are met by providing a camera mount which securely attaches to a variety of mounting surfaces.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

The camera mount has a mounting bracket which has a camera plate pivotally attached thereto. The mounting bracket can secure the camera mount and its camera plate to any desired surface. The camera plate receives the camera and is set to a desired position before or after the camera mount is secured to a desired surface. This camera can thus record the time an animal passes the camera, in order to provide information about the animal.

Figure 1:
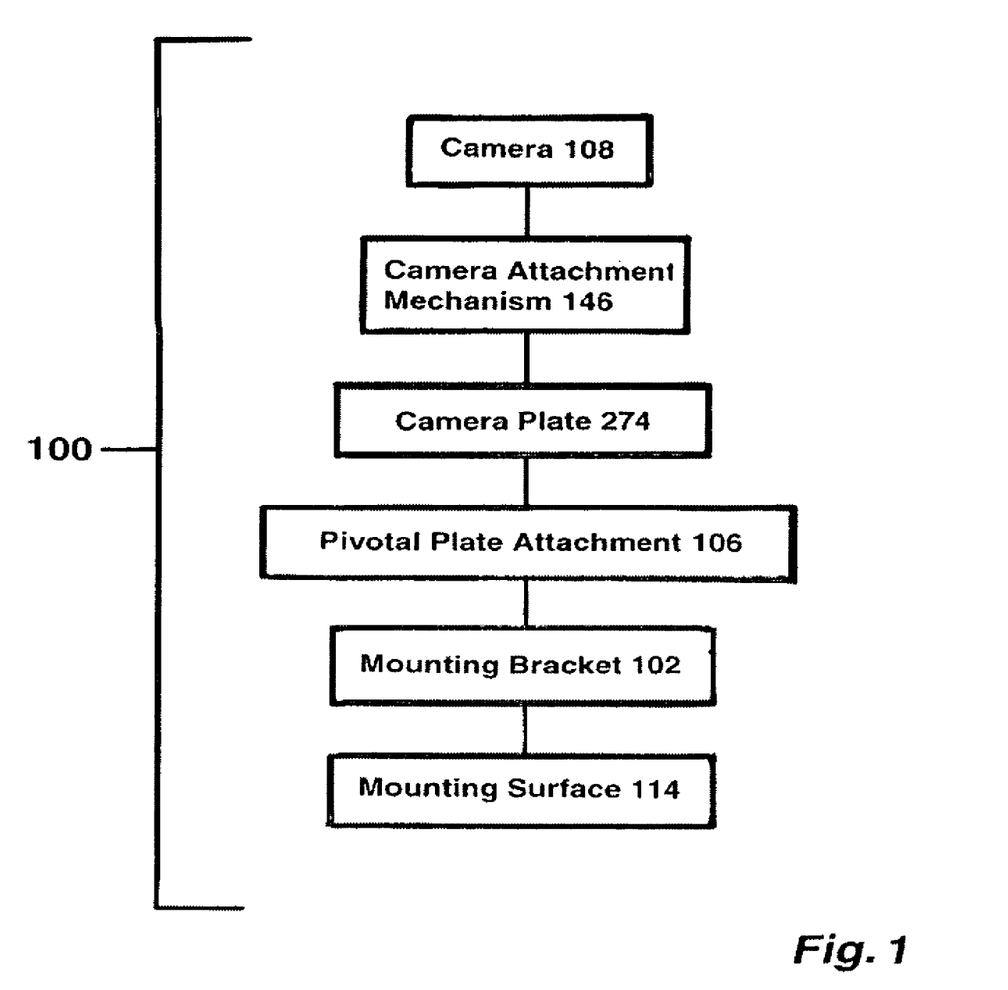
FIG. 1 depicts a block diagram of camera mount 100.

In FIG. 1, camera mount 100 has a mounting bracket 102 with a camera plate 274 connected thereto by a pivotal plate attachment 106. On the camera plate 274 is a camera attachment mechanism 146 for securing camera 108 thereto. Mounting bracket 102 attaches to camera attachment mechanism 146 and camera plate 274 through pivotal plate attachment 106. Mounting bracket 102 attaches to mounting surface 114 to support camera plate 274 in a desired position. Camera plate 274 pivotally attaches to mounting bracket 102.

Camera 108 attaches to camera plate 274 through a camera attachment mechanism 146. Camera 108 is a standard motion-activated camera, capable of taking a series of pictures marked with time and date. In this manner, the timing of animals passing by can be tabulated and used in any desired fashion.

Figure 2:
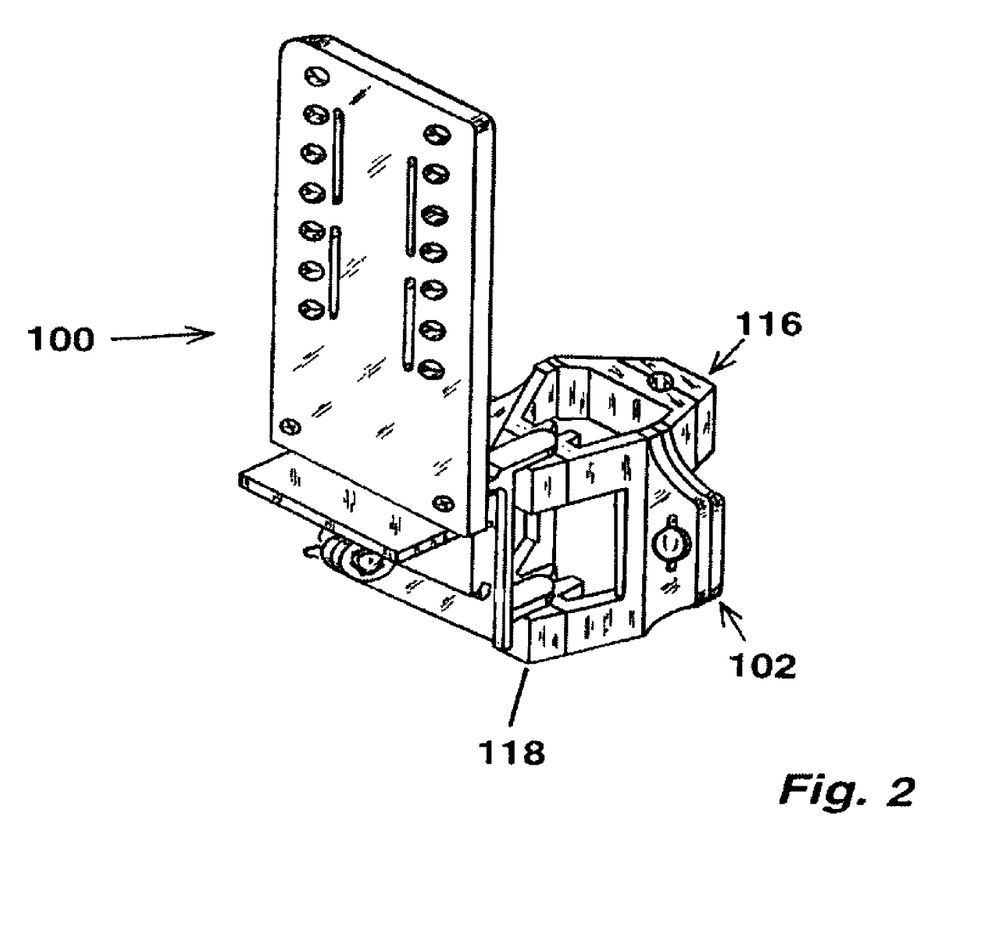
FIG. 2 depicts a right perspective view of camera mount 100 of this invention.
Figure 3:
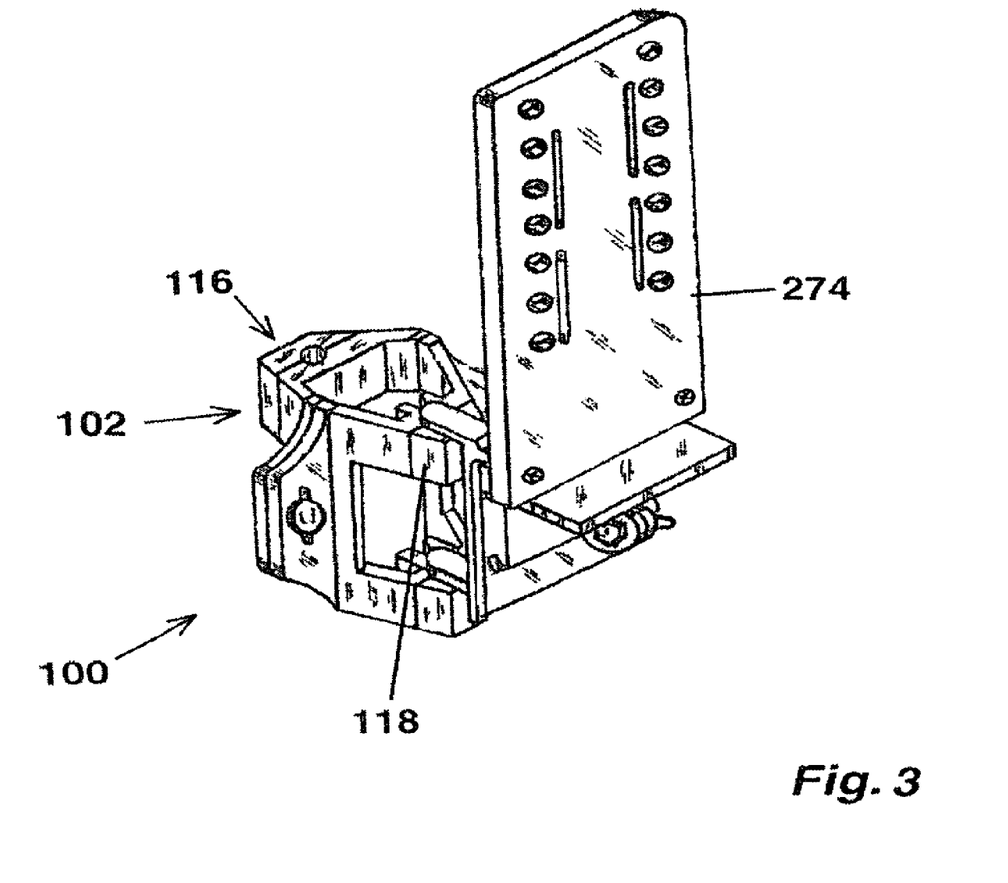
FIG. 3 depicts a left perspective view of camera mount 100 of this invention.

Now adding FIG. 2 and FIG. 3 to the consideration, the structure of mounting bracket 102 and camera plate 274 can be clearly seen. Mounting bracket 102 has a mounting end 116 and an attachment end 118. Mounting end 116 securely attaches camera mount 100 to the mounting surface 114 (FIG. 1), while the attachment end 118 permits mounting bracket 102 to be attached to camera plate 274. Camera plate 274 is designed to have camera 108 secured thereto and thereby securely attach camera 108 (FIG. 1) to mounting bracket 102.

Figure 4:
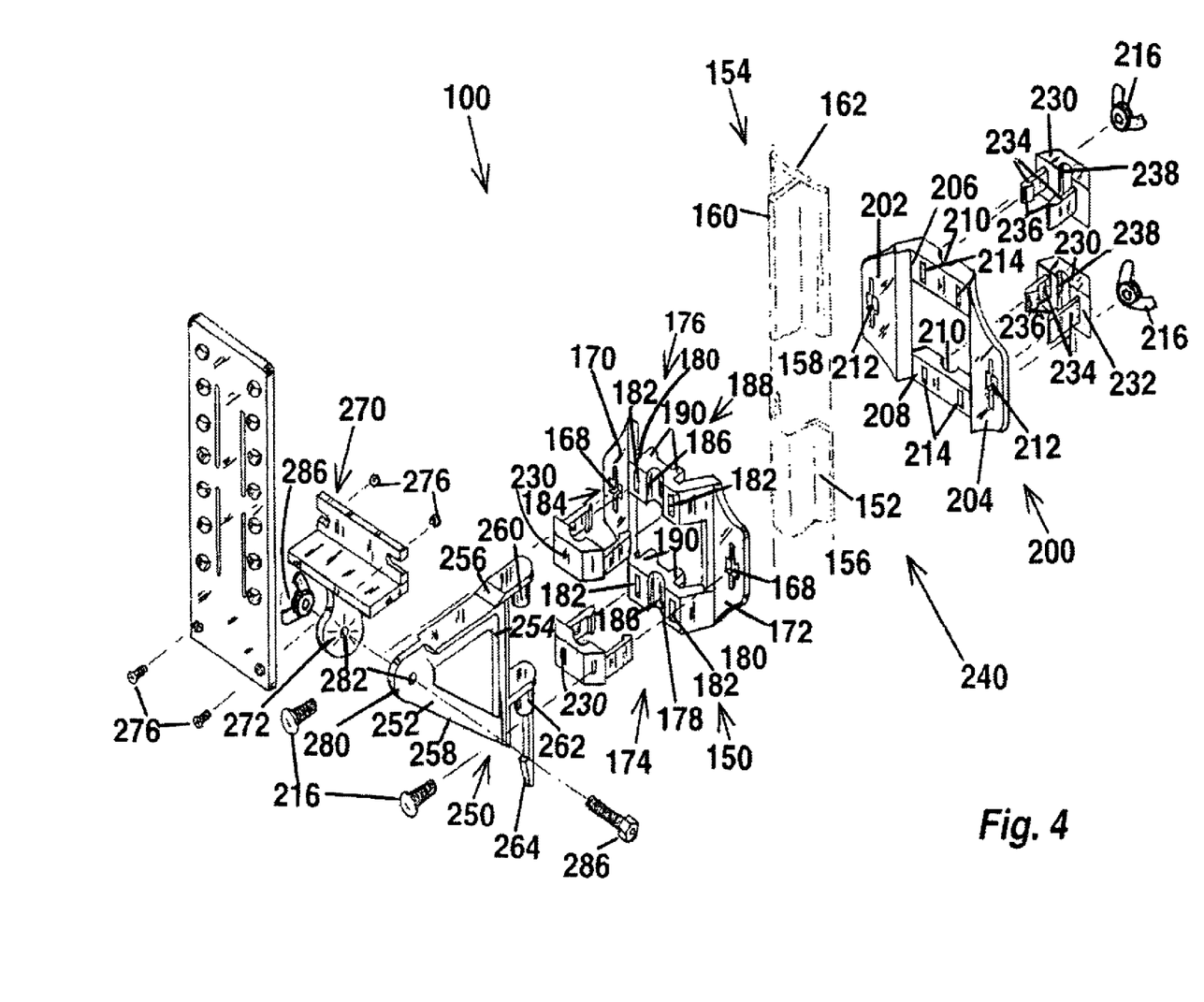
FIG. 4 depicts an exploded perspective view of camera mount 100 based on FIG. 1.

Still adding FIG. 4 to the consideration, mounting end 116 of mounting bracket 102 has an arced side piece 150 and a flat side piece 200, which cooperate to secure the camera mount 100 to an arced fence post 152 or a triangle fence post 154. Arced fence post 152 has an arced side 156 and a leveled plane side 158. Triangle fence post 154 has a ridged side 160 and flattened side 162.

Arced side piece 150 is adapted to contact arced fence post 152 or a triangle fence post 154 on the arced side 156 or the ridged side 160 respectively. Arced side piece 150 has a first securable mounting flange 170 oppositely disposed from a second securable mounting flange 172. Arced receiver housing 174 connects first securable mounting flange 170 to second securable mounting flange 172. First securable mounting flange 170 and second securable mounting flange 172 include mounting aperture 168.

Arced receiver housing 174 has an upper arced member 176 and a lower arced member 178, which have first securable mounting flange 170 and second securable mounting flange 172 mounted on opposite sides as extensions thereof. Upper arced member 176 and lower arced member 178 are preferably substantially similar in structure, with a substantially trapezoidal outline. Small base 180 of upper arced member 176 and lower arced member 178 each include a centrally located base groove 186 flanked by open slots 182 on base exterior 184. The four open slots 182 communicate with base interior 188.

Oppositely disposed from and adjacent to centrally located base groove 186 are support ridges 190 on either side thereof. Each support ridge 190 is adjacent to centrally located base groove 186 and one of open slot 182. Each support ridge 190 appears adjacent to fence post 152 or 154.

Flat side piece 200 has a first flat flange 202 with a second flat flange 204 oppositely disposed therefrom. Connecting first flat flange 202 and second flat flange 204 are an upper base bar 206 and a lower base bar 208. Upper base bar 206 and lower base bar 208 have first flat flange 202 and second flat flange 204 mounted on opposite sides as extensions thereof. Upper base bar 206 and lower base bar 208 are preferably substantially similar in structure. Each of first flat flange 202 and second flat flange 204 have securing flat aperture 212 therein.

Upper base bar 206 and lower base bar 208 further include outer groove 210 having base slots 214 on either side thereof. Base slots 214 cooperate with clip members 230 to support camera plate 274. In fact this structure facilitates mounting of the camera plate 274 on either side of the mounting bracket 102.

Figure 9:
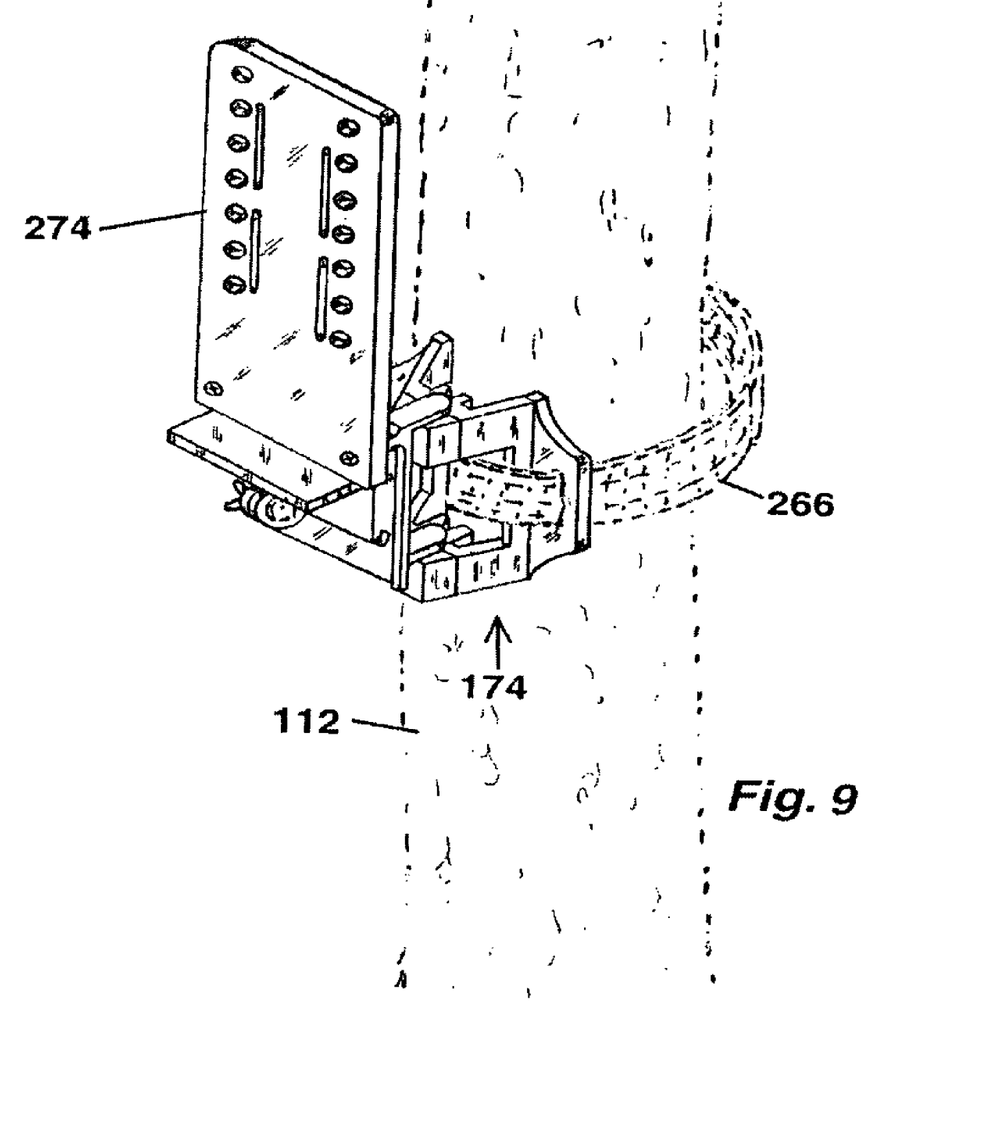
FIG. 9 depicts a perspective view of camera mount 100 of this invention in use on a tree 112.

Securing flat aperture 212 cooperates with mounting aperture 168 to secure camera mount 100 to either arced fence post 152 or a triangle fence post 154 as desired. A nut and bolt assembly 216 is used for that purpose. Tree straps 222, as shown in FIG. 9 on the arced side 156 through securing flat aperture 212 and mounting aperture 168 on either side of camera mount 100 permit attaching of camera mount 100 to a tree 112 or other mounting surface 114 as shown in FIG. 1.

Clip members 230 cooperate with base slots 214 and open slots 182 to support camera plate 274 on either side of mounting bracket 102. So camera plate 274 may be mounted adjacent to either arced side piece 150 and flat side piece 200. Each of the four clip members 230 has a clip arc 232 with a clip foot 234 extending from each side thereof. Each clip foot 234 has sloped raised member 236 for positioning the clip member 230 as part of the mounting bracket 102.

Because clip arc 232 permits each clip foot 234 to move relative its adjacent clip foot 234, each clip member 230 can occupy a pair of base slots 214 or open slots 182. With a clip slot 238 between each pair of clip feet 234, clip member 230 cooperates with outer groove 210 or centrally located base groove 186 to form four of mounting aperture 240, two of mounting aperture 240 being on arced side piece 150 and two of mounting aperture 240 being on flat side piece 200. Each pair of mounting aperture 240 cooperates to receive camera plate 274.

Mounting bracket 102 includes a mounting brace 250, and camera plate 274 has a camera support 270. Connecting mounting brace 250 to camera support 270 is the pivot bracket 280. Mounting brace 250 is received in either the pair of mounting aperture 240 on arced side piece 150 or flat side piece 200.

Mounting brace 250 includes a triangle brace 252, with a support arm 254, a mounting arm 256 and a brace arm 258. Support arm 254 mounts adjacent to either arced side piece 150 or flat side piece 200. From support arm 254 extends an upper rod 260 and a lower rod 262. Both upper rod 260 and a lower rod 262 extend parallel to support arm 254. Upper rod 260 and a lower rod 262 fit a member of the pair of mounting aperture 240.

While upper rod 260 just fits therethrough, lower rod 262 terminates at the point of an inclined plane 264, which fits completely through mounting aperture 240 and acts as a locking member to secure camera plate 274 in mounting bracket 102 as desired. Lower rod 262 operates in this fashion because of a slight flexibility relative to support arm 254.

Preferably, mounting arm 256 extends perpendicular to support arm 254 to reach camera support 270 through pivot bracket 280. Camera support 270 has a pivot receiver 272 connected to the pivot bracket 280. Pivot receiver 272 extends into camera plate 274. Camera plate 274 supports camera 108. Pivot receiver 272 permits pivot bracket 280 to be locked in a position to hold camera 108. Pivot receiver 272 and pivot bracket 280 are releasably and pivotally secured together through pivot nut and bolt assembly 286.

Pivot receiver 272 and pivot bracket 280 have mating notches 282 with pivot nut and bolt assembly 286 to hold the position in the mating notches 282 and provide flexible positioning for camera 108. Thus, camera mount 100 provides a flexible positioning for camera 108.

With brace arm 258 preferably forming the hypotenuse of a right triangle including support arm 254 and mounting arm 256, camera plate 274 has strong support. Camera 108 fits on either side of arced side piece 150 and flat side piece 200 when on fence post 152 or 154. With camera 108 on arced side piece 150, camera mount 100 may fit on tree 112 with tree straps 266.

Figure 5:
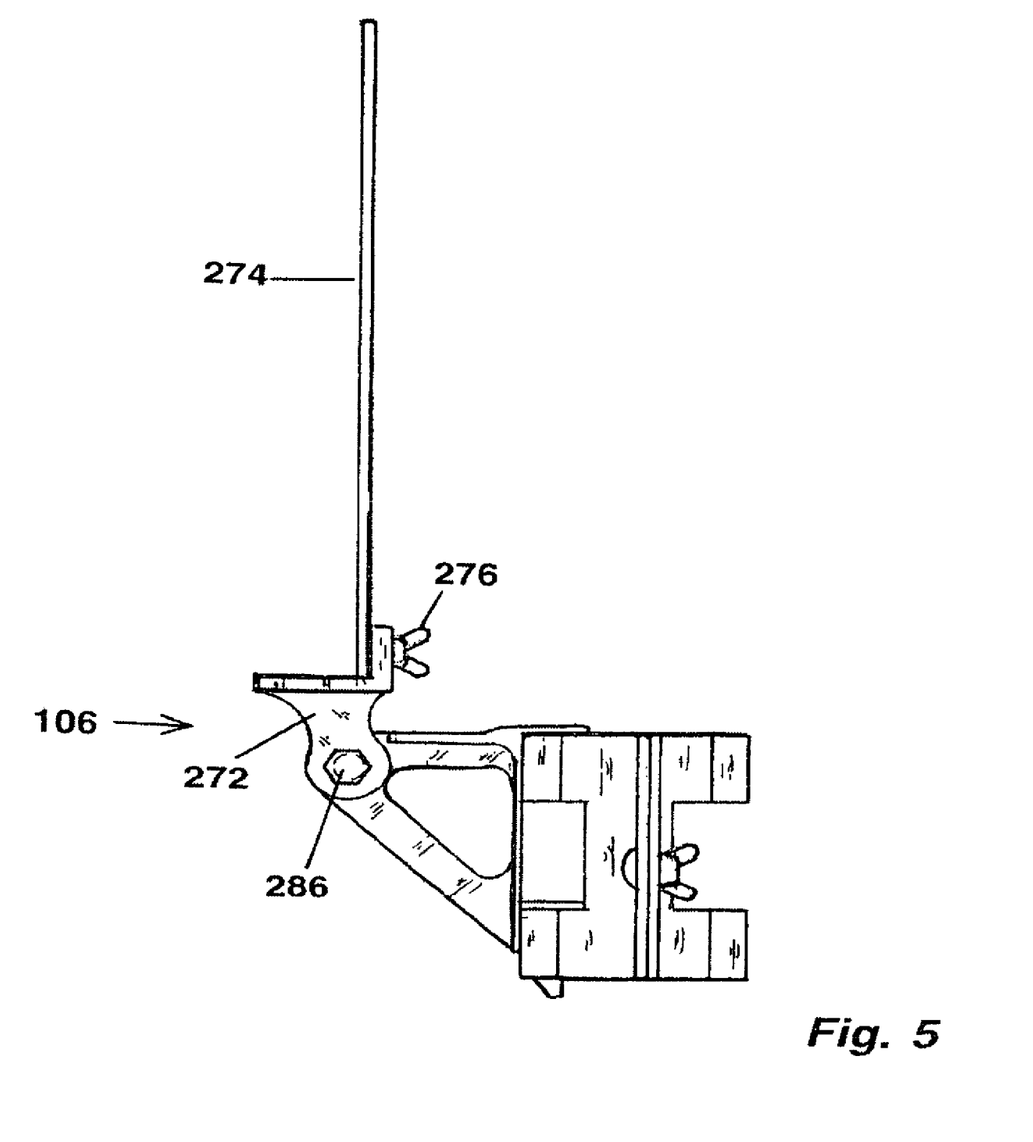
FIG. 5 depicts a side view of camera mount 100.
Figure 6:
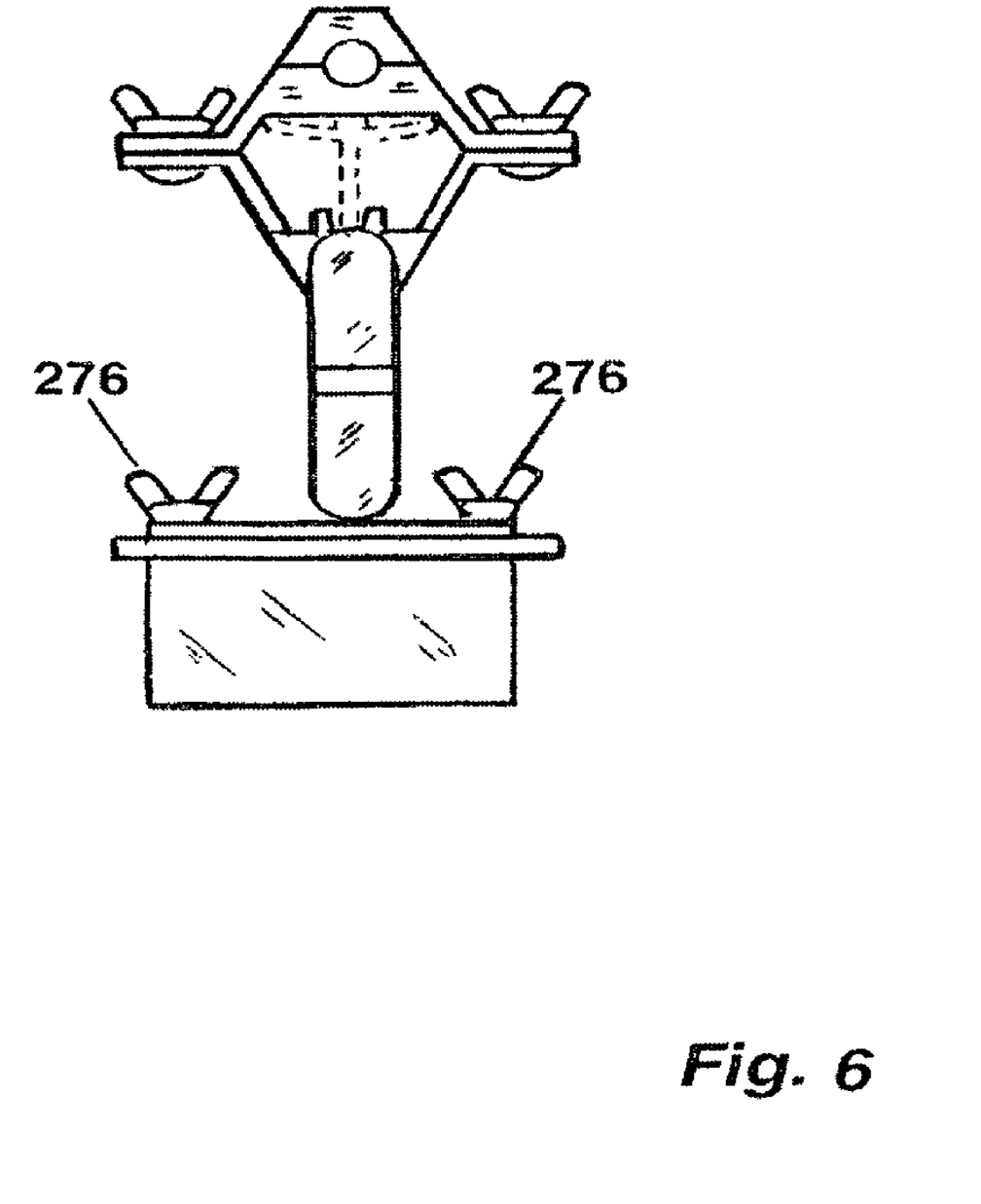
FIG. 6 depicts a top plan view of camera mount 100.
Figure 7:
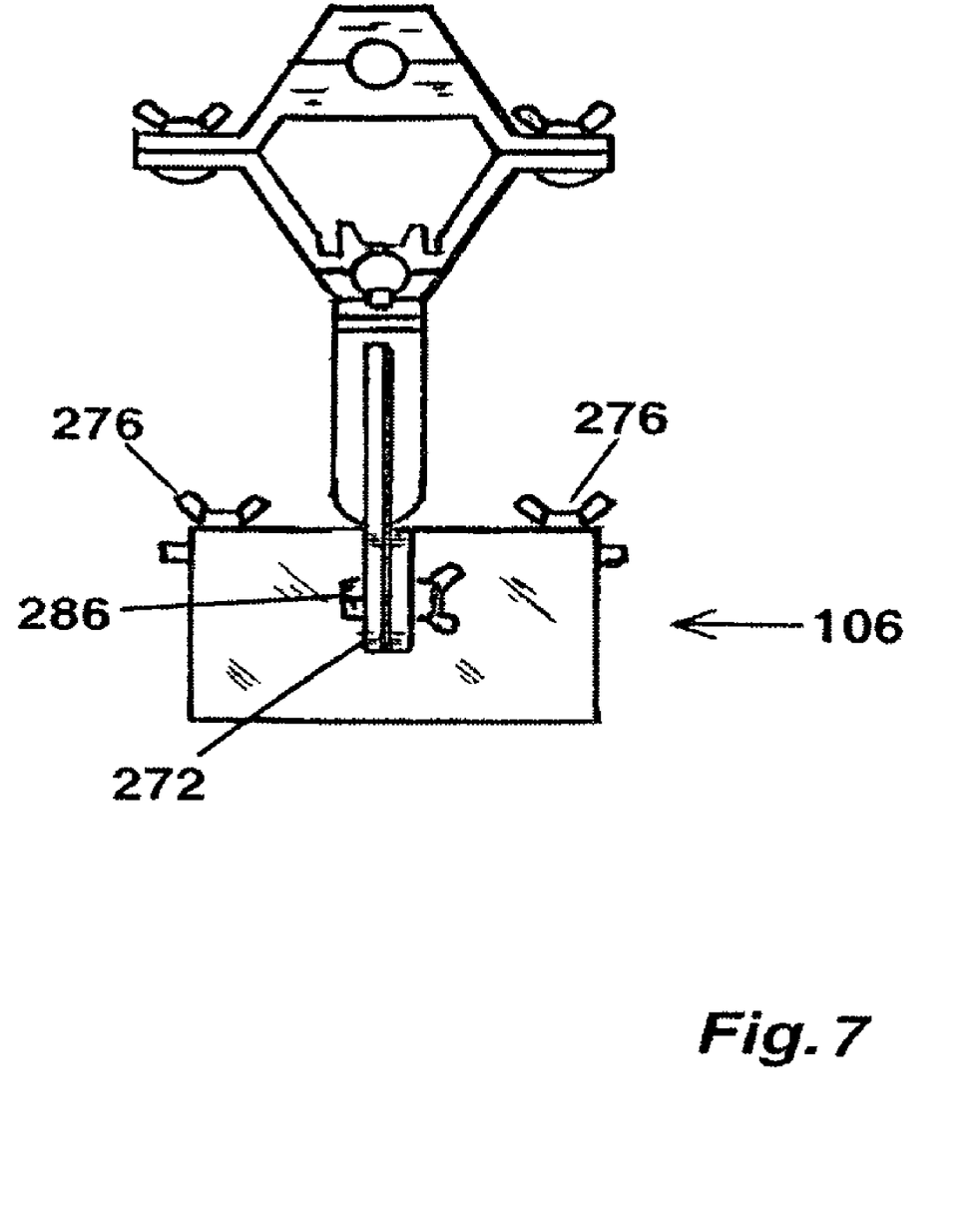
FIG. 7 depicts a bottom plan view of camera mount 100.

Now adding FIG. 5, FIG. 6 and FIG. 7 to the consideration, pivotal plate attachment 106 shows its function. Pivot receiver 272 of pivotal plate attachment 106 has camera plate 274 attached thereto with plate nut and bolt 276 and rests on camera support 270 thereof. Pivot receiver 272 cooperates with pivot bracket 280 and is adjusted in position by pivot nut and bolt 286.

Figure 8:
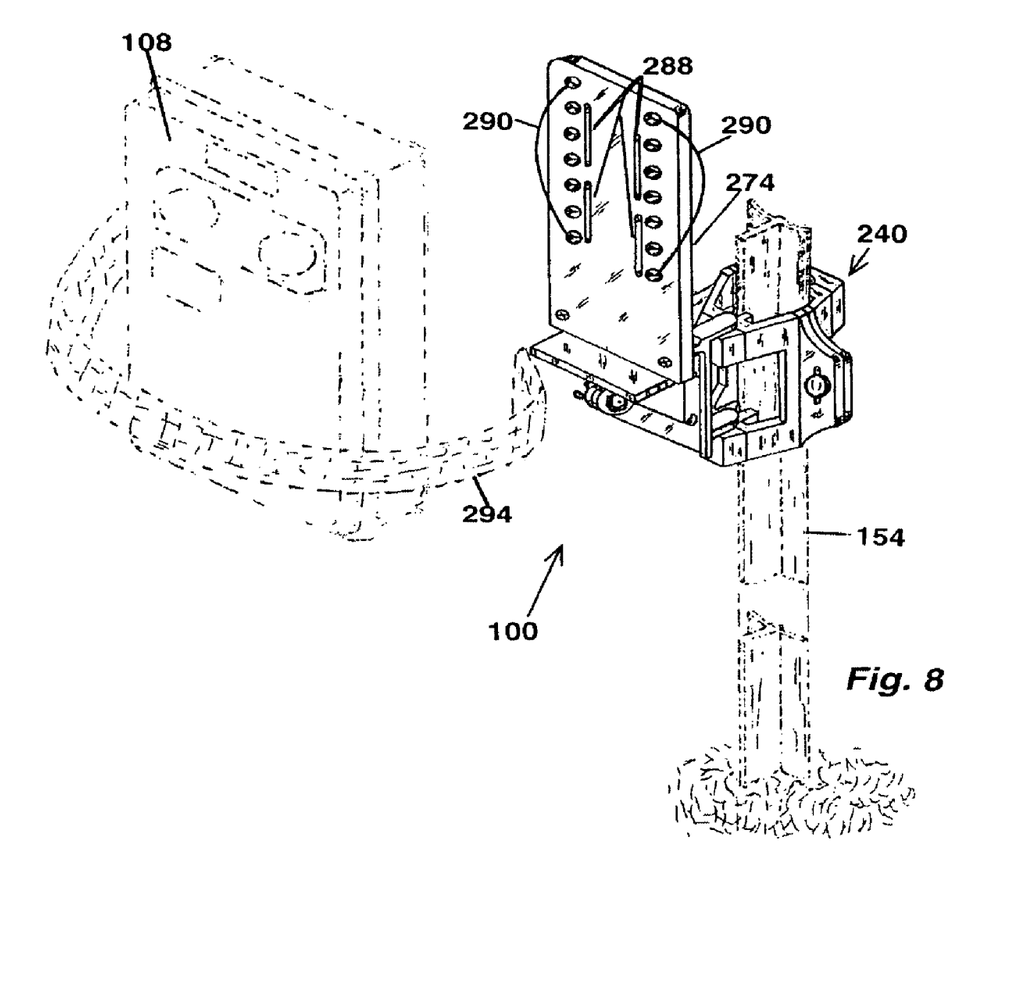
FIG. 8 depicts a perspective view of camera mount 100 of this invention in use on a triangle fence post 154.

Further considering FIG. 8, plate slots 288 and plate apertures 290 in camera plate 274 permit attachment of camera 108 thereto with camera strap 294 or other suitable device. Camera mount 100 is secured to triangle fence post 154. Camera plate 274 can easily be switched to mounting aperture 240 on the reverse side thereof.

With FIG. 9, the function of tree strap 266 can be seen. By the same tree straps 266 on the arced receiver housing 174 through securing flat aperture 212 and mounting aperture 168 on either side of camera mount 100 permit attaching of camera mount 100 to a tree 112 or other similar surface.

Figure 10:
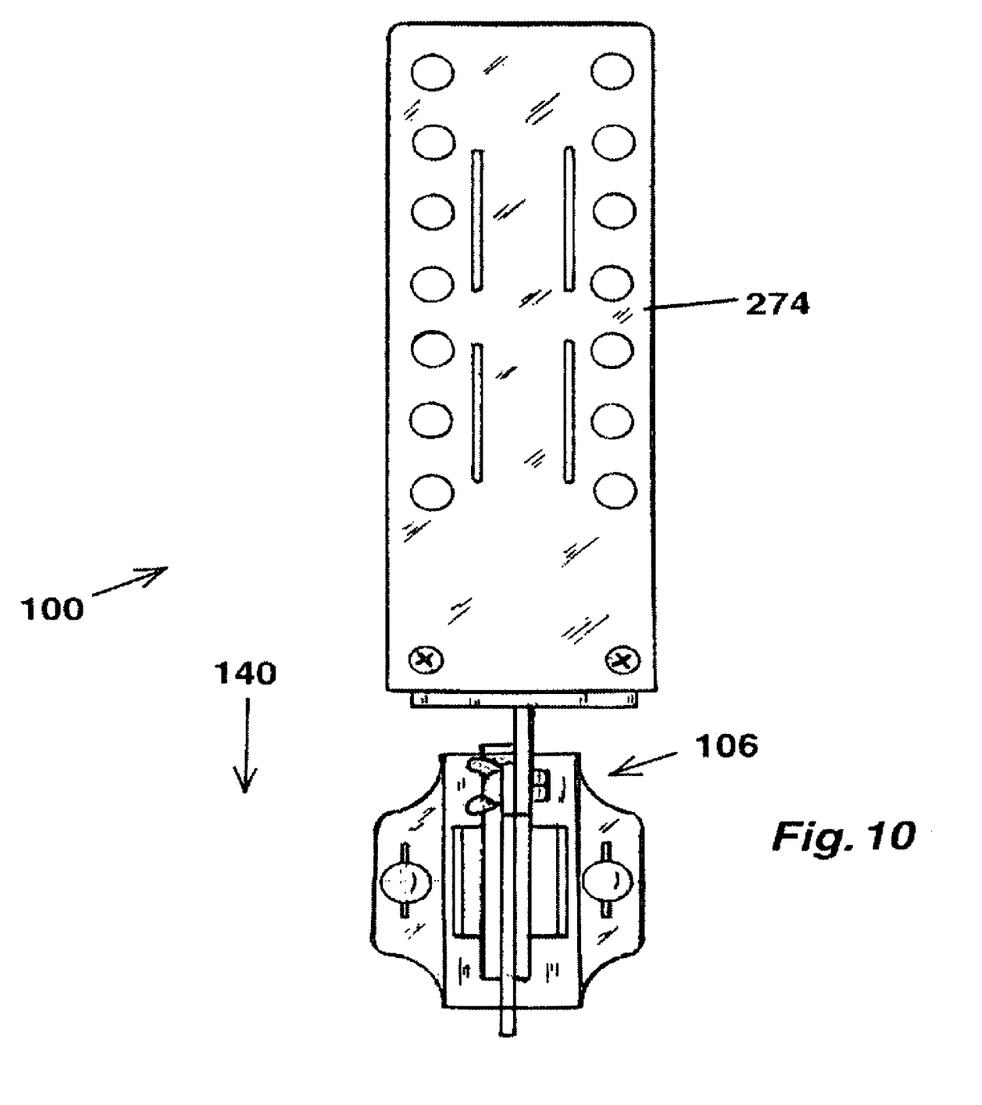
FIG. 10 depicts a front plan view of camera mount 100.
Figure 11:
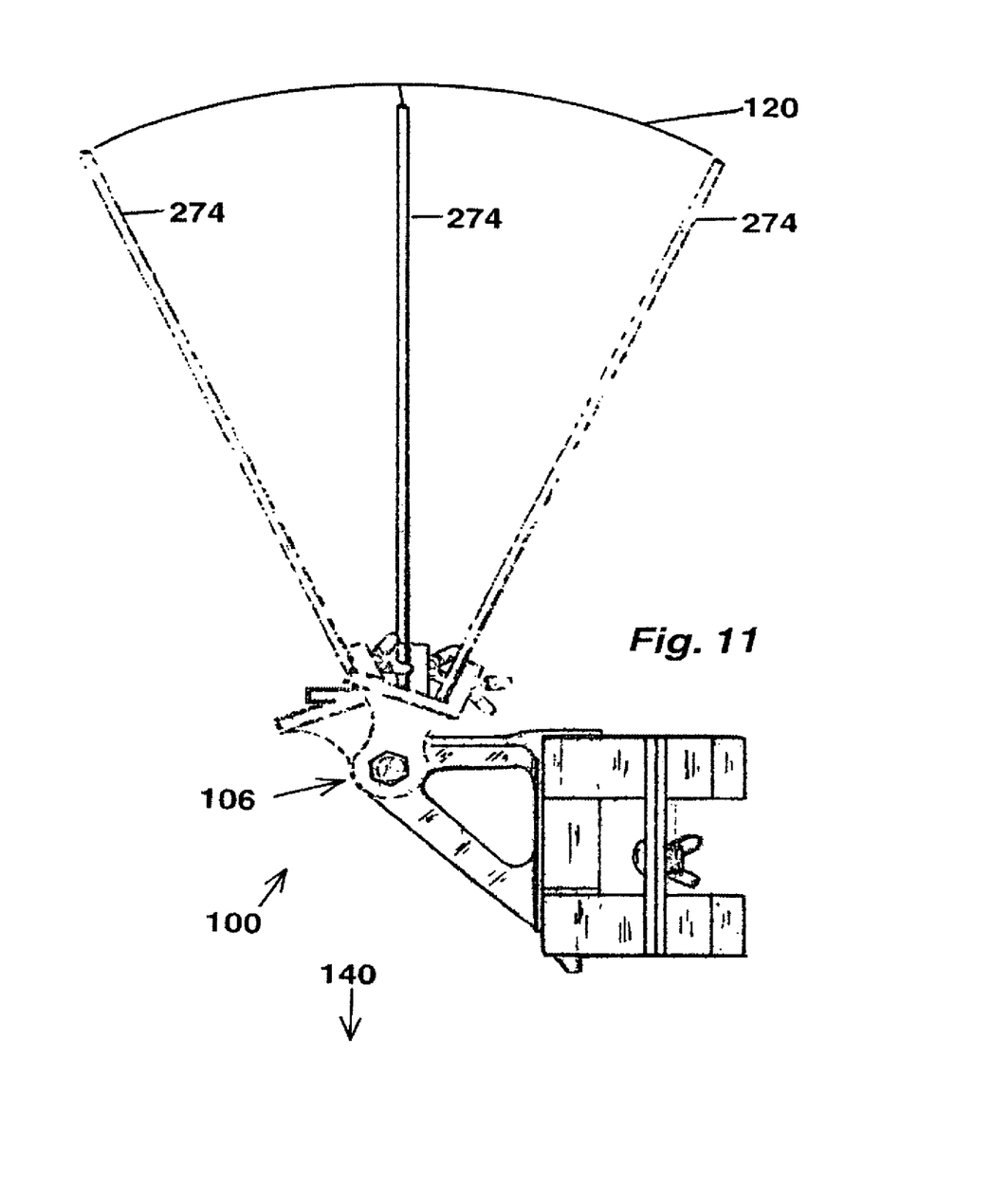
FIG. 11 depicts a side view of camera mount 100 showing angle positions 120.
Figure 12:
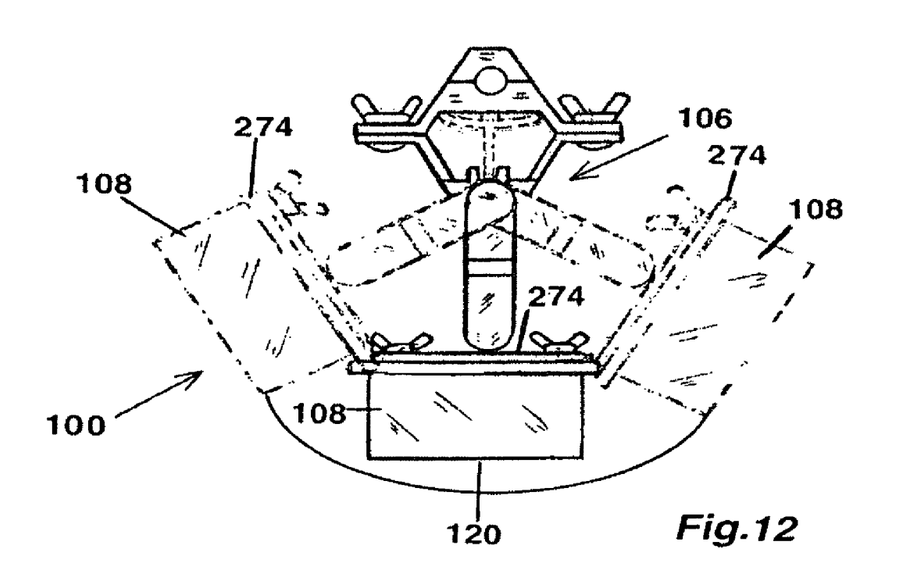
FIG. 12 depicts a top plan view of camera mount 100 showing angle positions 120.

Adding FIG. 10, FIG. 11 and FIG. 12 to the consideration, the flexibility of camera mount 100 can clearly be seen. Pivotal plate attachment 106 allows camera plate 274 to be positioned at a variety of angle positions 120 relative to ground 140. These variety of angles allow camera 108 (FIG. 1) to be positioned at the desired angle depending upon the ground 140 whether it be level, uphill, or downhill, depending on the mounting surface 114, and a desired line of sight for camera pictures.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A camera mount for supporting a camera in a desired position comprising:
    a) a mounting bracket having a camera plate cooperating therewith to form the camera mount;
    b) the camera plate being adapted to receive the camera;
    c) the mounting bracket supporting the camera plate in the desired position;
    d) the camera plate being movable relative to the mounting bracket;
    e) the camera mount being attachable to a variety of surfaces;
    f) a pivotal plate attachment connecting the camera plate to the mounting bracket;
    g) the camera plate including a camera attachment mechanism for securing a camera thereto;
    h) the mounting bracket having a mounting end and an attachment end;
    i) the mounting end attaching the camera mount to a mounting surface;
    i) the attachment end attaching to the camera plate;
    j) the mounting bracket including an arced side piece and a flat side piece;
    k) the arced side piece cooperating with the flat side piece in order to permit the camera mount to be attached to a fence post;
    l) the arced side piece having a first mounting flange oppositely disposed from a second mounting flange;
    m) the arced side piece having an arced receiver housing connecting the first securable mounting flange to the second securable mounting flange;
    n) the flat side piece having a first flat flange with a second flat flange oppositely disposed therefrom;
    o) an upper base bar and a lower base bar connecting the first flat flange to the second flat flange;
    p) the first mounting flange cooperating with the first flat flange to provide a first mounting aperture for the camera mount; and
    q) the second mounting flange cooperating with the second flat flange to provide a second mounting aperture for the camera mount.

2. The camera mount of claim 1 further comprising:
    a) the arced receiver housing has an upper arced member and a lower arced member;
    b) the upper arced member and the lower arced member being substantially similar in structure;
    c) the upper arced member and the lower arced member having a substantially trapezoidal outline with a small base extending upwardly;
    d) the small base including a centrally located base groove flanked by a first open slot and a second open slot on opposing sides thereof;
    e) the small base having a base exterior and a base interior;
    f) a first support ridge and a second support ridge on the base interior;
    g) the centrally located base groove being situated on the base exterior;
    h) a first support ridge being situated between the first open slot and the centrally located base groove;
    i) a second support ridge being situated between the second open slot and the centrally located base groove; and
    j) a clip member cooperating with the centrally located base groove to support the camera plate as desired.

3. The camera mount of claim 2 further comprising:
    a) the flat side piece having a first flat flange with a second flat flange oppositely disposed therefrom;
    b) the flat side piece having an upper base bar and a lower base bar connecting the first flat flange and the second flat flange;
    c) the first flat flange having a first securing flat aperture therein;
    d) the second flat flange having a second securing flat aperture therein;
    e) the upper base bar having a first outer groove;
    f) the first outer groove having base slots on either side thereof in the upper base bar;
    g) the lower base bar having a second outer groove;
    h) the second outer groove having base slots on either side thereof in the lower base bar; and
    i) the clip member also cooperating with the first outer groove and the second outer groove to support the camera plate as desired.

4. The camera mount of claim 3 further comprising:
    a) the clip member cooperating with the outer groove or the centrally located base groove to support the camera plate on either side of mounting bracket;
    b) the clip member having a clip arc with a clip foot extending from each side thereof;
    c) the clip foot having a sloped raised member for positioning the clip member as part of the mounting bracket;
    d) the clip arc permitting each clip foot to move relative its adjacent clip foot;
    e) the clip member can occupying an adjoining pair of base slots or an adjoining pair of open slots;
    f) the clip slot cooperating with the outer groove or the centrally located base groove to form a mounting aperture;

g) two of the mounting aperture being on the arced side piece to form an arced pair and two of the mounting aperture being on flat side piece to form a flat pair; and h) the arced pair or the flat pair cooperating to receive the camera plate.

5. The camera mount of claim 4 further comprising:

a) the mounting bracket including a mounting brace;

b) the camera plate having a camera support;

c) a pivot bracket connecting the mounting brace to the camera support;

d) the arced pair or the flat pair cooperating to receive the mounting brace;

e) the mounting brace including a triangle brace, with a support arm, a mounting arm, and a brace arm;

f) the support arm being mountable in either the arced pair or the flat pair; and g) the support including an upper rod and a lower rod.

6. The camera mount of claim 5 further comprising:

a) the upper rod and the lower rod extending parallel to the support arm;

b) the upper rod and the lower rod each fitting a member of the arced pair or of the flat pair; and c) the lower rod terminating at the point of an inclined plane; which fits completely through a member of the arced pair or of the flat pair and acts as a locking member to secure the camera plate in the mounting bracket.

7. The camera mount of claim 6 further comprising:

a) the lower rod being at least slightly flexible relative to support arm;

b) the mounting arm extending substantially perpendicular to the support arm in order to reach the camera support through the pivot bracket;

c) the camera support further including a pivot receiver connected to the pivot bracket; and d) the pivot receiver extending into the camera plate.

8. The camera mount of claim 7 further comprising:

a) a pivot nut and bolt releasably and pivotally securing the pivot receiver and the pivot bracket to be locked in a position to hold a camera;

b) the pivot bracket having mating notches aligning with pivot receiver to permit the pivot nut and bolt assembly pivot receiver and the pivot bracket in a desired position; and c) the brace arm forming a hypotenuse for a right triangle including the support arm and the mounting arm.

9. The camera mount of claim 7 further comprising:

a) a set of camera plate slots receiving a camera strap; and b) the camera strap securing the camera to the camera plate.

10. The camera mount of claim 8 further comprising:

a) at least one tree strap securing the camera mount to a tree; and b) the first mounting aperture and the second mounting aperture cooperating with the at least one tree strap to permit attaching of the camera mount to a tree.

11. In a camera mount for supporting a camera in a desired position, the improvement comprising:

a) the camera mount having a mounting bracket with a camera plate cooperating therewith;

b) the camera plate receiving the camera;

c) the mounting bracket supporting the camera plate in the desired position;

d) the camera plate being movable relative to the mounting bracket;

e) the camera mount being attachable to a variety of surfaces;

f) a pivotal plate attachment connecting the camera plate to the mounting bracket;

g) the camera plate including a camera attachment mechanism for securing a camera thereto;

h) the mounting bracket having a mounting end and an attachment end;

i) the mounting end attaching the camera mount to a mounting surface;

j) the attachment end attaching to the camera plate;

k) the mounting bracket including an arced side piece and a flat side piece;

l) the arced side piece cooperating with the flat side piece in order to permit the camera mount to be attached to a fence post;

m) the arced side piece having a first mounting flange oppositely disposed from a second mounting flange;

n) the arced side piece having an arced receiver housing connecting the first securable mounting flange to the second securable mounting flange;

o) the flat side piece having a first flat flange with a second flat flange oppositely disposed therefrom;

p) an upper base bar and a lower base bar connecting the first flat flange to the second flat flange;

q) the first mounting flange cooperating with the first flat flange to provide a first mounting aperture for the camera mount; and r) the second mounting flange cooperating with the second flat flange to provide a second mounting aperture for the camera mount.

12. The camera mount of claim 11 further comprising:

a) the arced receiver housing has an upper arced member and a lower arced member;

b) the upper arced member and the lower arced member being substantially similar in structure;

c) the upper arced member and the lower arced member having a substantially trapezoidal outline with a small base extending upwardly;

d) the small base including a centrally located base groove flanked by a first open slot and a second open slot on opposing sides thereof;

e) the small base having a base exterior and a base interior;

f) a first support ridge and a second support ridge on the base interior;

g) the centrally located base groove being situated on the base exterior;

h) a first support ridge being situated between the first open slot and the centrally located base groove;

i) a second support ridge being situated between the second open slot and the centrally located base groove; and j) a clip member cooperating with the centrally located base groove to support the camera plate as desired.

13. The camera mount of claim 12 further comprising:

a) the flat side piece having a first flat flange with a second flat flange oppositely disposed therefrom;

b) the flat side piece having an upper base bar and a lower base bar connecting the first flat flange and the second flat flange;

c) the first flat flange having a first securing flat aperture therein;

d) the second flat flange having a second securing flat aperture therein;

e) the upper base bar having a first outer groove;

f) the first outer groove having base slots on either side thereof in the upper base bar;

g) the lower base bar having a second outer groove;

h) the second outer groove having base slots on either side thereof in the lower base bar; and i) the clip member also cooperating with the first outer groove and the second outer groove to support the camera plate as desired.

14. The camera mount of claim 13 further comprising:
a) the clip member cooperating with the outer groove or the centrally located base groove to support the camera plate on either side of mounting bracket;
b) the clip member having a clip arc with a clip foot extending from each side thereof;
c) the clip foot having a sloped raised member for positioning the clip member as part of the mounting bracket;
d) the clip arc permitting each clip foot to move relative its adjacent clip foot;
e) the clip member can occupying an adjoining pair of base slots or an adjoining pair of open slots;
f) the clip slot cooperating with the outer groove or the centrally located base groove to form a mounting aperture;
g) two of the mounting aperture being on the arced side piece to form an arced pair and two of the mounting aperture being on flat side piece to form a flat pair; and
h) the arced pair or the flat pair cooperating to receive the camera plate.

15. The camera mount of claim 14 further comprising:
a) the mounting bracket including a mounting brace;
b) the camera plate having a camera support;
c) a pivot bracket connecting the mounting brace to the camera support;
d) the arced pair or the flat pair cooperating to receive the mounting brace;
e) the mounting brace including a triangle brace, with a support arm, a mounting arm, and a brace arm;
f) the support arm being mountable in either the arced pair or the flat pair; and
g) the support including an upper rod and a lower rod.

16. The camera mount of claim 15 further comprising:
a) the upper rod and the lower rod extending parallel to the support arm;
b) the upper rod and the lower rod each fitting a member of the arced pair or of the flat pair; and
c) the lower rod terminating at the point of an inclined plane; which fits completely through a member of the arced pair or of the flat pair and acts as a locking member to secure the camera plate in the mounting bracket.

17. The camera mount of claim 16 further comprising:
a) the lower rod being at least slightly flexible relative to support arm;
b) the mounting arm extending substantially perpendicular to the support arm in order to reach the camera support through the pivot bracket;
c) the camera support further including a pivot receiver connected to the pivot bracket;
d) the pivot receiver extending into the camera plate;
e) a pivot nut and bolt releasably and pivotally securing the pivot receiver and the pivot bracket to be locked in a position to hold a camera;
f) the pivot bracket having mating notches aligning with pivot receiver to permit the pivot nut and bolt assembly pivot receiver and the pivot bracket in a desired position; and
g) the brace arm forming a hypotenuse for a right triangle including the support arm and the mounting arm.

\* \* \* \* \*